United States Patent [19]

Rosenquist

[11] Patent Number: 5,461,121
[45] Date of Patent: Oct. 24, 1995

[54] PROCESS FOR THE MANUFACTURE OF POLYCARBONATE-OLIGOMERS WITHOUT SOLVENT

[75] Inventor: Niles R. Rosenquist, Evansville, Ind.

[73] Assignee: General Electric Co., Pittsfield, Mass.

[21] Appl. No.: 278,358

[22] Filed: Jul. 21, 1994

Related U.S. Application Data

[62] Division of Ser. No. 58,070, May 4, 1993, Pat. No. 5,344,908.

[51] Int. Cl.$^6$ .................................................. C08G 64/00
[52] U.S. Cl. ........................... 525/462; 528/196; 525/464
[58] Field of Search ............................ 528/196; 525/462, 525/464

[56] References Cited

U.S. PATENT DOCUMENTS

| | | | |
|---|---|---|---|
| 2,381,366 | 9/1945 | Patnode | 528/42 |
| 2,421,653 | 6/1947 | Sauer | 528/10 |
| 2,629,726 | 2/1953 | Hyde | 556/451 |
| 3,189,662 | 1/1961 | Vaughn | 525/474 |
| 4,243,779 | 1/1981 | McAlister | 525/462 |
| 4,644,053 | 2/1987 | Brunelle et al. | 528/371 |
| 4,849,502 | 7/1989 | Evans et al. | 528/371 |
| 4,920,183 | 4/1990 | Evans et al. | 525/464 |
| 4,960,863 | 10/1990 | Rosenquist | 528/480 |
| 4,973,665 | 11/1990 | Rosenquist | 528/480 |
| 4,999,408 | 3/1991 | Rosenquist | 528/29 |

FOREIGN PATENT DOCUMENTS 60-114576  6/1985  Japan.

Primary Examiner—James J. Seidleck
Assistant Examiner—Terressa M. Mosley

[57] ABSTRACT

Polycarbonate oligomers having hydroxy end groups are produced by a melt reaction with bisphenol-A and a basic catalyst. The oligomers may then be reacted with chloro end-group siloxanes in the presence of a solvent and an acid acceptor to yield polycarbonate-polysiloxane block co-polymers. The melt reaction occurs at elevated temperature without the direct use of phosgene gas.

14 Claims, No Drawings

PROCESS FOR THE MANUFACTURE OF POLYCARBONATE-OLIGOMERS WITHOUT SOLVENT

This is a divisional of application Ser. No. 08/058,070 filed on May 4, 1993 now U.S. Pat. No. 5,344,908.

BACKGROUND OF THE INVENTION

The present invention relates to a method for making silicone-polycarbonate block co-polymers. In particular, the invention relates to a method whereby polycarbonate oligomers having terminal hydroxy groups are produced by a melt reaction of polycarbonate resin with a dihydric phenol in the presence of a catalyst and in the absence of an organic solvent. The oligomers are thereafter combined with polyorganosiloxanes having terminal chloro-organo siloxy groups to produce the block co-polymers. The method employed is effective to produce the block co-polymers without directly using phosgene gas in the final synthesis.

A siloxane polycarbonate resin can be made in a two-step process involving first reacting chloro end group siloxane oligomers with an excess of bisphenol-A (BPA), then reacting the resulting phenolic hydroxy end group siloxane with additional BPA and phosgene in a conventional interfacial phosgenation reaction to yield the desired block co-polymer. One such useful polycarbonate-polydimethylsiloxane block co-polymer contains 43 weight percent siloxane units with an average block length of about 10. The material has utility as an impact modifier in blends with polycarbonate resin and as a film used as an interlayer in multilayer laminates of polycarbonate resin sheets and acrylic resin sheets. Typically, these laminates consist of two or more layers of polycarbonate sheet, optionally with an internal layer of acrylic sheet, with the resin interlayers serving as an adhesive and as a spacer to separate the sheets.

In a particular process set forth in Vaughn, U.S. Pat. No. 3,189,662, assigned to the Assignee herein and incorporated herein by reference, silicone-polycarbonate block co-polymers are made by phosgenating a mixture of dihydric phenol terminated polydiorganosiloxane and dihydric phenol in the presence of an organic solvent and an acid acceptor. Although the method results in the production of silicone-polycarbonate block copolymers useful in a variety of applications, such as injection moldable thermoplastics and elastomers having improved tensile properties, the method requires the direct use of phosgene gas in the final synthesis.

Silicone-poly(arylcarbonate) block co-polymers can be made without directly using phosgene gas in the final synthesis of the block co-polymer as set forth in Evans, U.S. Pat. No. 4,920,183, assigned to the Assignee herein. A hydroxyaryl terminated poly(arylcarbonate) oligomer having an average of about 2 to about 1,000 chemically combined arylcarbonate units is interconnected with a chlorine terminated polydiorganosiloxane having an average of about 2 to about 1,000 chemically combined diorganosiloxy units, in the presence of an organic solvent and an acid acceptor. The silicone-poly(arylcarbonate) block co-polymer is recovered from the mixture for example by addition of the reaction mixture to a precipitating solvent such as methanol.

Evans et al. '183, also discusses the manufacture of hydroxyaryl oligomers. According to Evans et al., these oligomers can be made by effecting the polymerization of cyclic arylcarbonates in the presence of phenol or bisphenol-A (BPA) as shown in U.S. Pat. No. 4,849,502, assigned to the Assignee herein and incorporated by reference.

Evans et al. discusses another procedure which can be used to make hydroxyaryl oligomers by the controlled reaction in a suitable solvent of high molecular weight polycarbonate resin with a phenol or polyhydric phenol and a polymerization initiator, such as alkaline metal phenoxide or polycarbonate formation catalysts as set forth in Brunelle et al., U.S. Pat. No. 4,644,053, assigned to the Assignee herein and incorporated by reference.

Chlorine terminated polydiorganosiloxane can be made by known procedures such as by the controlled hydrolysis of diorganodihalosilane, for example, dimethyldichlorosilane set forth in U.S. Pat. Nos. 2,381,366 and 2,629,726. Another procedure which can be employed to make chlorine terminated polydiorganosiloxane is the equilibration of a mixture of diorganochlorosilane and a cyclic polydiorganosiloxane, for example, octamethylcyclotetrasiloxane, in the presence of a metal catalyst such as ferric chloride as set forth in U.S. Pat. No. 2,421,653.

Japanese patent application no. 60-114576 discloses a process to produce low molecular weight polycarbonates having terminal hydroxy groups produced by the reaction of high molecular weight polycarbonates with hydroxy compounds, e.g. 1,6-hexane diol and diethylene glycol. Although 2,2-bis(4-hydroxyphenyl)propane is disclosed within a long list of possibly useful candidate hydroxy compounds, it is not mentioned as a preferred compound. No disclosure is made in the reference as to the ratio of bisphenol-A to polycarbonate. The reference also fails to disclose reacting a hydroxyaryl terminated polycarbonate oligomer with a polydiorganosiloxane to form a polycarbonate-polysiloxane block co-polymers. Industry is currently seeking simplified processes for producing silicone-polyarylcarbonate block co-polymers with reduced solvents and without the direct use of phosgene gas.

SUMMARY OF THE INVENTION

The present invention is based upon the discovery that a hydroxy terminated polycarbonate oligomer can be produced by a melt reaction of a polycarbonate resin with a bisphenol-A in the presence of a basic catalyst and in the absence of a solvent. The mole ratio of BPA to polycarbonate is in the preferred range of about 1:50 to about 5:10 and preferably about 2:10 to about 4:10. The hydroxy terminated polycarbonate oligomer may thereafter be reacted with a chlorine terminated polyorganosiloxane in the presence of an organic solvent and an acid acceptor to yield a silicon polycarbonate copolymer without the direct use of phosgene. In a particular embodiment, the poly-carbonate oligomers are combined with silicone compo-sitions to produce silicone-polycarbonate block co-polymers.

DESCRIPTION OF THE INVENTION

The invention relates to the solventless manufacture of useful polycarbonate oligomers without directly using phosgene. The oligomers may be relatively short hydroxyaryl terminated polycarbonate oligomers having an average of about 2 to about 50, preferably 2 to about 15, more preferably about 3 to about 6, chemically combined carbonate units. The polycarbonate oligomers are produced by a melt reaction of a polycarbonate resin with a dihydric phenol such as bisphenol-A (BPA), ie 2,2-bis(4-hydroxy-phenyl propane) in the absence of a solvent and without directly using phosgene gas. The mole ratio of BPA to polycarbonate is preferably in the range of about 1:50 to about 5:10 and more preferably about 2:10 to about 4:10. As used herein throughout the term polycarbonate, in the expression mole ratio of. BPA to polycarbonate, should be understood to mean polycarbonate repeat units in the polymer chain. The polycarbonate oligomers are reacted with a chlorine terminated polyorganosiloxane having an average of about 2 to about 100, preferably about 5 to about 60 and more preferably about 7 to about 12, chemically combined organosiloxy units in an organic solvent to form the silicone polycarbonate block co-polymer.

In the invention, a high molecular weight polycarbonate resin is used as a starting material and is melt reacted with BPA to produce polycarbonate oligomers with hydroxy end groups. The polycarbonate oligomers thus produced may be used without directly using phosgene gas in the final synthesis of the block co-polymers. The terms "polycarbonate resins" and "dihydric phenol" are well known and have been defined in detail in U.S. Pat. Nos. 4,960,863; 4,973,665 and 4,999,408, all of which are incorporated herein by reference.

The polycarbonate (PC) resin may be one of many available materials having an intrinsic viscosity ranging from about 0.4 to about 1.6 dl/g in methylene chloride at 25° C. and a molecular weight ranging from about 20,000 to about 100,000. In the examples below, a blend of PC resins having intrinsic viscosities of 0.6 and 1.5 dl/g are used, and the PC oligomers have an average chain length of about 4 carbonate units.

The formation of silicone-polycarbonate co-polymers occurs by reaction of the hydroxyaryl oligomers and the chlorine terminated polydiorganosiloxanes at elevated temperatures in the presence of an organic solvent (e.g., methelene chloride) and an acid acceptor (e.g., triethylamine). The order of addition of the reaction is not critical. Reaction temperatures which can be used range from about 15° C. to about 40° C. Recovery of the silicone polycarbonate block co-polymer can be affected by the addition of the reaction mixture to a precipitating solvent such as methanol, or by steam precipitation.

The silicone polycarbonate block co-polymer made by the method of the invention can be used as a laminating agent for polycarbonates, and as an impact modifier in blends with polycarbonate and other resins.

The polyorganosiloxane material may have a chain length ranging from about 2 to about 100, preferably about 5 to about 60 and more preferably about 7 to about 12. In the examples below, the polyorganosiloxane is a polydimethylsiloxane (PDMS) having an average chain length of about 8 to about 10 dimethylsiloxane units, also known as D units.

In order that those skilled in the art would be better able to practice the invention, the following examples are given by way of illustration and not by way of limitation.

METHOD 1

PC Oligomer Preparation (small scale)

A blend of 300 g of polycarbonate resin (intrinsic viscosity of 0.57 dl/g at 25° C. in methylene chloride) and 0.7 g (0.00125 mole) of tetrabutylammonium tetraphenylborate was intensively mixed for 30 seconds in a type FM 10L mixer manufactured by Rheinstahl Henschel AG. To that blend was then added 970 g additional polycarbonate resin of the same grade (total of 1270 g, 5 moles) and 342 g (1.5 moles) bisphenol-A. After thorough blending, that mixture was introduced into a model Z SK-30 twin screw extruder manufactured by Werner Pfleiderer Co. operated at 260° C. The oligomer product exited the extruder as a liquid stream and was collected by quenching in water. The oligomers were characterized by gel permeation chromatography (GPC) (see table).

METHOD 2

PC Oligomer Preparation (large scale)

A blend of 1.36 kg of polycarbonate resin (intrinsic viscosity of 0.57 dl/g) and 6.45 g of tetramethylammonium hydroxide pentahydrate was intensively mixed for 30 seconds as in Method 1. This was repeated, and the 2.73 kg of catalyst-containing blend was then mixed in a ribbon blender with 8 kg of the same grade of polycarbonate resin, 60.9 kg of high molecular weight polycarbonate resin (intrinsic viscosity of 1.5 dl/g) and 19.2 kg of bisphenol-A. The mixture was then melt processed in an extruder as described in Method 1 at a temperature of 277° C. The oligomer product exited the extruder as a liquid stream which was collected by contacting with the chilled stainless steel rolls (two 6 inch diameter counter-rotating rolls) of a standard dual roll flaker device. The oligomers were characterized by GPC.

| Ex. (5) | BPA/PC Unit Mole Ratio | Resin Grade (1) | End Capping (Mole %) | Catalyst (Mole %) | GPC (3) MW | MN | Corrected (4) MN |
|---|---|---|---|---|---|---|---|
| 1 | 1/10 | 100% PC1 | 2.3% | 0.025% (6) | 6300 | 1400 | 1620 |
| 2 | 2/10 | 100% PC1 | 2.3% | 0.025% (6) | 3800 | 700 | 870 |
| 3 | 3/10 | 100% PC1 | 2.3% | 0.025% (6) | 2400 | 500 | 600 |
| 4 | 3/10 | 25% PC1 75% PC2 | 0.7% (2) | 0.025% (6) | 28400 | 4500 | 4960 |
| 5 | 3/10 | 25% PC1 75% PC2 | 0.7% | 0.025% (7) | 2500 | 500 | 660 |
| 6 | 3/10 | 25% PC1 75% PC2 | 0.7% | 0.1 (7)(8) | 1500 | 500 | 660 |
| 7 | 3/10 | 25% PC1 75% PC2 | 0.7% | 0.005% (7) | 7700 | 640 | 810 |
| 8 | 3/10 | 25% PC1 75% PC2 | 0.7% | 0.01% (7) | 6700 | 900 | 1090 |
| 9 | 3/10 | 25% PC1 75% PC2 | 0.7% | 0.025% (7) | 1800 | 500 | 660 |
| 10 | 3/10 | 25% PC1 75% PC2 | 0.7% | 0.025% (7)(9) | 2600 | 550 | 710 |

-continued

| Ex. (5) | BPA/PC Unit Mole Ratio | Resin Grade (1) | End Capping (Mole %) | Catalyst (Mole %) | GPC (3) MW | MN | Corrected (4) MN |
|---|---|---|---|---|---|---|---|
| 11 | 3/10 | 25% PC1 75% PC2 | 0.7% | 0.025% (7)(9) | 2600 | 550 | 710 |
| 12 | 4.8/10 | 25% PC1 75% PC2 | 0.7% | 0.025% (7) | 2300 | 500 | 740 |
| 13 | 3/10 | 25% PC1 75% PC2 | 0.7% | 0.025% (7) | 2700 | 500 | 770 |
| 14 | 1.3/10 | 25% PC1 75% PC2 | 0.7% | 0.025% (7) | 8000 | 700 | 1340 |

(1) PC1 resin and PC2 resin had IV's respectively of 0.57 and 1.5 dl/g.
(2) Calculated mole %, based on 2.3 mold % end capping in PC1 and 0.17 mole % end capping in PC2.
(3) MW = Weight Average Molecular Weight
MN = Number Average Molecular Weight
Data as generated by Gel Permeation Chromatograph (GPC). Gel Permeation chromatography analysis was carried out on a Watters Associates Model 150C instrument fitted with, two ultrastyragel linear columns and one 500 angstrom ultrastyragel column using chloroform as solvent The instrument was calibrated using bisphenol-A polycarbonate resin standards. The molecular weight data is reported under "GPC" in the table is the data generated directly by the GPC analysis. since, however, the (molecular weight materials being analyzed for here, a second number average molecular weight value, indicated as the "corrected MN" in the table, is also reported. This was done by reassigning MN of 228, 482, 736 and 990 which are, respectively, the molecular weight of bisphenol-A and the three lowest hydroxy end group polycarbonate oligomers, to the four lowest MN peaks generated in the GPC analysis.
(4) MW data after reassignment of MW 228, 482, 736 and 990 (i.e. BPA, "dimmer", "trimmer", "tetrimer") to the four low MW peaks in the GPC.
(5) Ex. 1–14 Method 1. Ex. 16 Method 2.
(6) Tetrabutylammonium tetraphenylborate used as catalyst.
(7) Tetramethylammonium hydroxide pentahydrate used as catalyst.
(8) Oligomers had a yellow color.
(9) Examples 10 and 11 differ in that for 10, the catalyst was premixed with the PC1 and for 11, the catalyst was premixed with the blend of PC1 and PC2.

Examples 1–3 vary the mole ratio of BPA/PC between 1:10 and 3:10. Examples 12–14 show a wider range of BPA/PC mole ratios between 1:10 and 4.8:10, with the amount of catalyst and resin being held constant. Added BPA lowers the molecular weight of the oligomers.

Examples 4–6 show that different catalysts cause different results generally. The borate catalyst performed well with the low molecular weight, low viscosity (high end capping) PC1 resin of Examples 1–3, but was not as effective with the high molecular weight, high viscosity (low endcapping) PC2 resin of Example 4. The tetramethylammonium hydroxide (ammonium based catalyst) does not exhibit the same variation in results as the borate catalyst.

Examples 5–9 show an effective range of ammonium based catalyst, with Example 9 being about optimal for the conditions shown. Molecular weight goes to a minimum at about 0.025 mole percent catalyst. Additional catalyst causes yellowing. Basic catalysts of various well known kinds may be used in effective amounts, for example, about 0.005 to about 0.1 mole percent to achieve the desired results. The basic catalysts used in the preparation of polycarbonate oligomers are any of the well-known and conventional basic catalysts. These catalysts include the organic and inorganic bases. Some illustrative and non-limiting examples of organic and inorganic base catalysts include lithium hydroxide, sodium carbonate, sodium acetate, sodium methylate, sodium borohydride, isopropyl amine, sodium phenoxide, sodium aluminumhydride and alkyl ammonium hydroxides such as tetramethylammonium hydroxide and tetraethylammonium hydroxide. Also included are compounds such as tetraalkylammonium tetraphenylborates that are known to convert to basic catalysts at the elevated temperatures used in the preparation of the polycarbonate oligomers.

The present invention employs polycarbonate as a raw material to produce polycarbonate oligomers in an extrusion reaction without solvent or phosgene. The oligomers are combined with siloxanes to produce desired polycarbonate-siloxane co-polymers.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed:

1. An improved method for making polycarbonate-oligomers comprising melt reacting a polycarbonate resin and bisphenol-A (BPA) in the presence of a basic catalyst to produce a hydroxyaryl terminated polycarbonate oligomer wherein the improvement comprises conducting the melt reaction between bisphenol-A and a polycarbonate resin having an intrinsic viscosity ranging from about 0.4 to about 1.6 dl/g in methylene chloride at 25° C. and a molecular weight ranging from about 20,000 to about 100,000 in a mole ratio of BPA to polycarbonate in the range of about 1:50 to about 5:10 and in the absence of phosgene and solvent whereby the oligomer has an average of about 2 to about 50 chemically combined carbonate units.

2. The method according to claim 1, wherein the polycarbonate oligomers have from about 2 to about 15 carbonate units.

3. The method according to claim 1, wherein the polycarbonate oligomers have from about 3 to about 6 carbonate units.

4. The method according to claim 1, wherein the mole ratio of BPA to polycarbonate is about 2:10 to about 4:10.

5. The method according to claim 1, wherein the basic catalyst comprises at least one member selected from the group consisting of:
- tetrabutylammonium tetraphenylborate,
- tetraethylammonium hydroxide, and
- tetramethylammonium hydroxide.

6. The method according to claim 1, wherein the catalyst is present in a range of from about 0.005 to about 0.1 mole percent.

7. Polycarbonate oligomers comprising:
the solvent-free reaction product of a polycarbonate resin having an intrinsic viscosity ranging from about 0.4 to about 1.6 dl/g in methylene chloride at 25° C. and a molecular weight ranging from about 20,000 to about 100,000 and bisphenol-A (BPA) melt-reacted in the presence of a basic catalyst and in the absence of a solvent to produce hydroxyaryl terminated polycarbonate oligomers, having an average of about 2 to about 50 chemically combined carbonate units, wherein the mole ratio of BPA to polycarbonate is in the range of about 1:50 and about 5:10.

8. The polycarbonate oligomers of claim 7, wherein the mole ratio of BPA to polycarbonate is in the range of about 2:10 to about 4:10.

9. The polycarbonate oligomers of claim 7, having from about 2 to about 50 chemically combined carbonate units.

10. The polycarbonate oligomers of claim 7, having from about 2 to about 15 chemically combined carbonate units.

11. The polycarbonate oligomers of claim 7, having from about 3 to about 6 chemically combined carbonate units.

12. The polycarbonate oligomers of claim 7, wherein the polycarbonate resin has an intrinsic viscosity from about 0.4 to about 1.6 dl/g in methylene chloride at 25 ° C.

13. The polycarbonate oligomers of claim 7, wherein the basic catalyst comprises at least one member selected from the group consisting of:
- tetrabutylammonium tetraphenylborate,
- tetraethylammonium hydroxide, and
- tetramethylammonium hydroxide.

14. The polycarbonate oligomers of claim 7, wherein the catalyst is present in a range of from about 0.005 to about 0.1 mole percent.

* * * * *